(12) United States Patent
Mizumoto

(10) Patent No.: US 6,753,056 B1
(45) Date of Patent: Jun. 22, 2004

(54) DECORATIVE FILMS FOR GLASS-PANED WINDOW

(75) Inventor: Yoichiro Mizumoto, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/914,562

(22) PCT Filed: Feb. 25, 2000

(86) PCT No.: PCT/US00/04759

§ 371 (c)(1),
(2), (4) Date: Aug. 29, 2001

(87) PCT Pub. No.: WO00/53537

PCT Pub. Date: Sep. 14, 2000

(30) Foreign Application Priority Data

Mar. 10, 1999 (JP) .............................. 11/63463

(51) Int. Cl.[7] .................................... B32B 7/00
(52) U.S. Cl. .................. 428/41.8; 428/323; 428/324; 428/325; 428/328; 428/336; 428/343; 428/354; 428/403; 428/426; 428/542.2
(58) Field of Search ................... 428/13, 41.8, 323, 428/324, 325, 328, 334, 336, 343, 354, 403, 426, 542.2

(56) References Cited

U.S. PATENT DOCUMENTS

| 5,034,084 A | | 7/1991 | Schafer et al. ............... 156/278 |
| 5,370,913 A | * | 12/1994 | Lin ............................... 428/13 |
| 5,747,153 A | * | 5/1998 | McDaniel .................... 328/324 |
| 5,766,702 A | * | 6/1998 | Lin ............................... 428/13 |
| 6,158,156 A | * | 12/2000 | Patrick ......................... 40/443 |
| 6,531,230 B1 | * | 3/2003 | Weber et al. ................ 428/480 |

FOREIGN PATENT DOCUMENTS

| EP | 0298603 | 1/1989 |
| EP | 0578829 | 1/1994 |
| JP | 3041191 | 2/1990 |
| JP | 03069397 | 3/1991 |
| JP | 03143575 | 6/1991 |

* cited by examiner

Primary Examiner—Stevan A. Resan
(74) Attorney, Agent, or Firm—Jean A. Lown; Harold C. Knecht, III

(57) ABSTRACT

A decorative film for glass-paned window, which is superior in privacy protection, light screening property and decorative effect. The decorative film comprises a transparent substrate and a colored layer comprising ink containing an optical coherent pigment. The colored layer is provided on One surface of the substrate.

16 Claims, 2 Drawing Sheets

DECORATIVE FILMS FOR GLASS-PANED WINDOW

FIELD OF THE INVENTION

The present invention relates to a decorative film for glass-paned window and, more particularly, to a decorative film for glass-paned window, which is particularly superior in privacy protection, light screening property and decorative effect. The decorative film of the present invention can exert the excellent effect when applying to transparent glass-paned windows of structures such as house and building, and transparent glass-paned windows of vehicles such as car and train.

BACKGROUND

For the purpose of protecting privacy and screening light, it has widely been performed to coat a transparent glass-paned window with a special polarizing film through which the situation inside the room or vehicle can not be observed easily, heretofore. The polarizing film to be applied to the glass-paned window includes, for example, film obtained by coating a transparent substrate such as polyester film and polyolefin film with ink containing powders of a metal such as aluminum, titanium and nickel; metallic film obtained by laminating a metal such as aluminum, titanium and nickel on a substrate such as polyolefin film; and film obtained by coating a substrate with ink having high screening property. Regarding such a polarizing film, when the scene inside is observed from the outside through the glass-paned window to which the polarizing film is applied, the glass-paned window of a gray or similar halftone color can be seen, merely, but the situation inside can not be observed. This is because only a brightness of the outside of the glass-paned window is reflected by a polarizing function of the film. Inside of the glass-paned window, the outside scene can be seen similar to the case where the polarizing film is not used, and the view is not obstructed.

The polarizing film of the prior art is useful for protecting privacy and screening light, as described above. However, as explained previously, the color observed from the outside, when using prior polarizing film, is black or gray, or a similar halftone color. Therefore, still some room for improvement in appearance is left.

Although its purpose is not directed to improve the appearance of the polarizing film itself, Japanese Unexamined Patent Publication (Kokai) No. 3-69397 discloses a decorative screen capable of performing different displays at both sides of a transparent door, a window and a partition in the room without obstructing see-through and light screening properties. As schematically shown in FIG. 1, this decorative screen has such a construction that a printing layer 24 having a lot of through-holes 25 is provided on a substrate 20 made of a transparent plastic or glass and the printing layer 24 has respectively a surface pattern layer 21 and a back surface pattern layer 23 via a screen ink layer 22 interposed between both pattern layers. This decorative screen can be produced by making a transfer sheet having the printing layer 24, forming a lot of through-holes 25, and transferring the transfer sheet on one surface of a substrate. For example, when this decorative sheet is applied to the glass-paned window, it is possible to see the opposite side through a lot of through-pores 25 formed on the printing layer 24 from any side, and to see a different pattern from each side. Therefore, it can be used for the purpose of advertising and decorating. However, in case of this decorative screen, it is necessary to make a transfer sheet as its precursor and, therefore, the production becomes complicated and an increase in cost is not avoided. Furthermore, the printed pattern is unattractive because it depends on a normal printed technique, and a fine pattern can not be printed.

Furthermore, Japanese Utility Model Registration No. 3041191 discloses a removable sheet-like advertising display capable of displaying advertising contents at the window portion of the side of transfer vehicles bodies such as car and train without obstructing the view. As shown in FIG. 2, since an advertising display 31 is applied to the portion including a portion of a window 35 of the side of a transfer vehicle body via an adhesive portion 34, the advertising display has through-holes 32 penetrating the sheet on the whole surface and, at the same time, an advertising display portion (a portion of the English letter is shown in the drawing) 33 is provided on the surface. The through-holes 32 are provided with enough size and distance so that the pattern of the advertising display portion 33 can be clearly confirmed from the outside of the vehicle body and, at the same time, the scene of the outside can be seen from the interior of the vehicle body to some extent. However, in case of this advertising display, since a main portion of the sheet is occupied by the through-holes, the amount of an adhesive to be applied to the adhesive portion of the back surface becomes small and a sufficiently strong adhesive force can not be obtained. Furthermore, there is also a problem that, while the advertising display is applied to the glass-paned window, dust accumulates on the portion of the through-holes and the portion of the adhesive squeezed out by a pressing force at the time of applying the sheet, thereby to lower the adhesive force and durability. Although it is not disclosed in the specification, it is understood that the advertising display is produced by using the transfer method and perforating method in combination, similar to the decorative screen described previously with reference to FIG. 1. Accordingly, the production becomes complicated and there is a fear of causing such additional problems that an increase in cost is not avoided an a fine pattern can not be printed.

SUMMARY OF THE INVENTION

An object of the present invention is to solve one or more of the above problems of a decorative film for glass-paned windows of the prior art.

An additional object of the present invention is to provide a decorative film for glass-paned windows that is superior in at least one of its privacy protection, light screening property and decorative effect.

Another object of the present invention is to provide a decorative film for glass-paned windows that can be easily produced, has a sufficient adhesive force to the glass-paned window, and/or affords an attractive fine decorative pattern.

In accordance with one aspect of the present invention, a decorative film is provided that comprises a transparent substrate and a colored layer, where the colored layer comprises ink containing an optical coherent pigment. The colored layer is provided on one surface of the substrate.

According to one preferred embodiment, the decorative film of the present invention comprises a transparent substrate as well as a colored layer and a clear layer, which are laminated, in order, on one surface of the transparent substrate. An adhesive layer is provided on the surface of the substrate opposite the colored layer. The adhesive layer can be colored, but does not have to be, and the surface of the adhesive is preferably protected with a release liner such as release paper.

The decorative film of the present invention may also be used in the form of a modification of the above construction, according to the use and other factors. The decorative film of the present invention may have the other additional layer, in addition to the substrate and colored layer which are essential to the construction, and adhesive layer and clear layer which are preferably used. The respective layers may usually be used in the form of a single-layer, but may also be used as a multi-layer of two or more layers, if desired.

In the practice of the present invention, the transparent substrate is not specifically limited as long as it has enough of a self-supporting property to support the colored layer, but is preferably a plastic film. Suitable plastic film includes, for example, polyester film, polyethylene film, polycarbonate film, vinyl chloride film, acrylic film, polyurethane film, polyolefin film and vinylidene fluoride film, but is not limited thereto. The thickness of these films can vary widely according to use of the decorative film of the present invention, but is usually from about 30 to 150 $\mu$m. Such a substrate is preferably transparent, but may also be semi-transparent or slightly colored as far as it is desired and an adverse influence is not exerted on the effect of the present invention.

The colored layer provided on one surface of the transparent substrate is made of ink containing an optical coherent pigment capable of developing color by an interference action of light. The ink used herein is capable of printing by using a normal printing method such as screen printing method and gravure printing method. This printing may also be a single-color printing or a multi-color printing. The pigment capable of developing color by an interference action of light can afford a color developing effect peculiar to the pigment to ink, unlike ink with a normal solid color. Therefore, it is possible to remarkably improve the appearance and decorative effect of the decorative film obtained finally.

The ink constituting the colored layer is preferably polarizing pearl ink. The term "polarizing pearl ink" used in the specification of the present application refers to an ink containing an optical coherent pigment having an operation/working-effect of changing the color and light according to a viewing angle as a result of interference between reflected light and transmitted light. The ink preferably contains a scaly mica pigment such as titanium dioxide-coated mica flake, iron oxide-coated mica flake and bismuth trichloride, and a scaly flake such as scaly glass. The size of these optical coherent pigments can vary within a wide range, but it is preferred that they usually have an average particle diameter ranging from about 5 to 130 $\mu$m.

The amount of the pigment in the polarizing pearl ink can widely vary according to the desired color developing effect, but is generally preferred to be in the range of from greater than 1% by weight to less than 40% by weight, more preferably, within a range from about 3 to about 30% by weight. Most preferably, the content of the pigment is within a range from about 5 to about 15% by weight.

The film thickness of the colored layer can vary widely, but is preferably within a range from about 2 to about 20 $\mu$m.

The clear layer to be provided on the outermost layer of the decorative film preferably has weathering resistance and heat resistance, in addition to the transparency per se as an essential property, from such a viewpoint that the clear layer is used as a protective film. Preferably, the clear layer can be formed by selecting a suitable resin from various resins satisfying the property. The clear layer preferably has good adhesion with the colored layer as a ground thereof. Suitable resin used for forming the clear layer includes, for example, polyester resin, polyethylene resin, polycarbonate resin, vinyl chloride resin, acrylic resin, polyurethane resin, polyolefin resin and vinylidene fluoride resin, but is not limited thereto. The film thickness of the clear layer can vary widely according to the desired effect, but is preferably within a range of from about 5 to about 100 $\mu$m, and more preferably from about 20 to about 75 $\mu$m. Furthermore, as the operation/working-effect of the addition of the clear layer, it can be expected to afford luster to the surface of the decorative film.

In the decorative film for glass-paned windows of the present invention, it is preferred to provide an adhesive layer on the lower surface of the substrate, which supports the film when applying to the glass-paned window, thereby to facilitate handling and application of the film. Suitable adhesive layer is an adhesive layer with a release liner. Such an adhesive layer is commercially available, easily. By using such an adhesive layer with a release liner in combination with the decorative film for glass-paned window of the present invention, the decorative film can be applied by the same operation as that in case of applying a general polarizing film and a scattering preventing film when the decorative film is applied to a glass-paned window of home and store and a glass-paned window of a private car.

DETAILED DESCRIPTION

Figure 1:
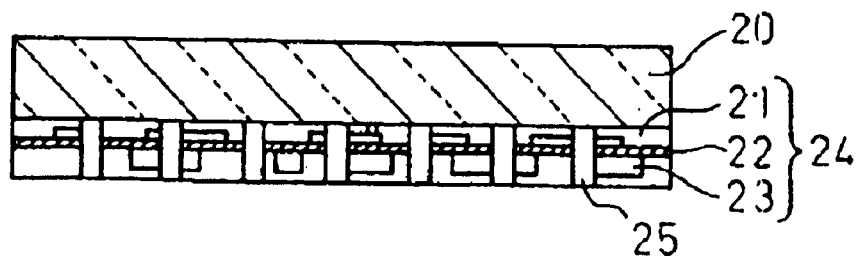
FIG. 1 is a cross-sectional view showing one example of a see-through decorative screen of the prior art.
Figure 2:
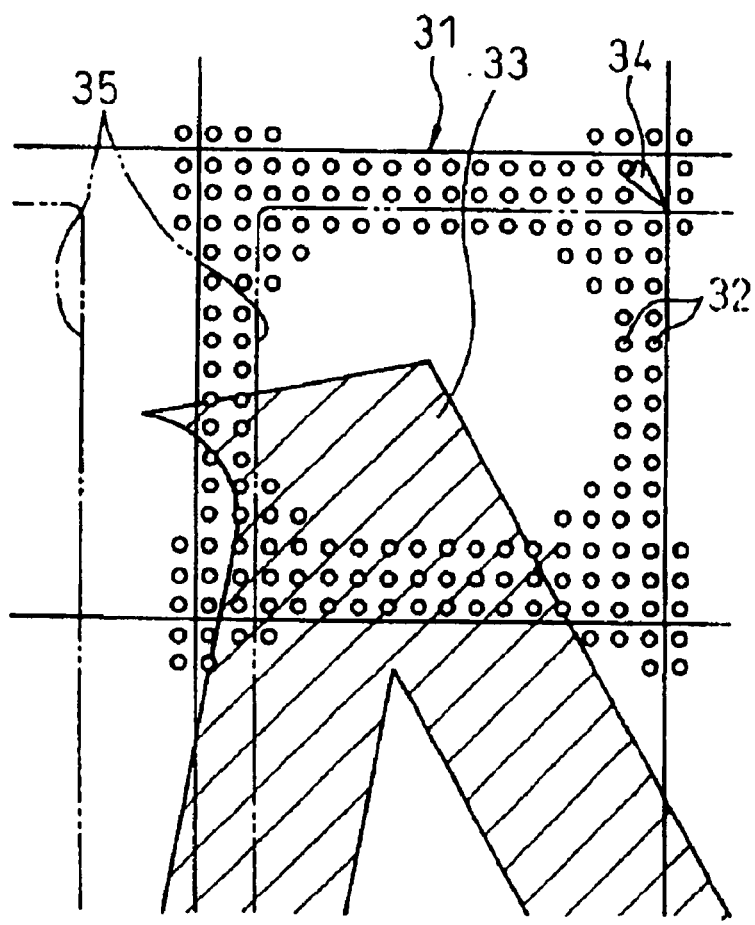
FIG. 2 is a front view showing one example of an advertising display for transfer vehicle body.
Figure 3:
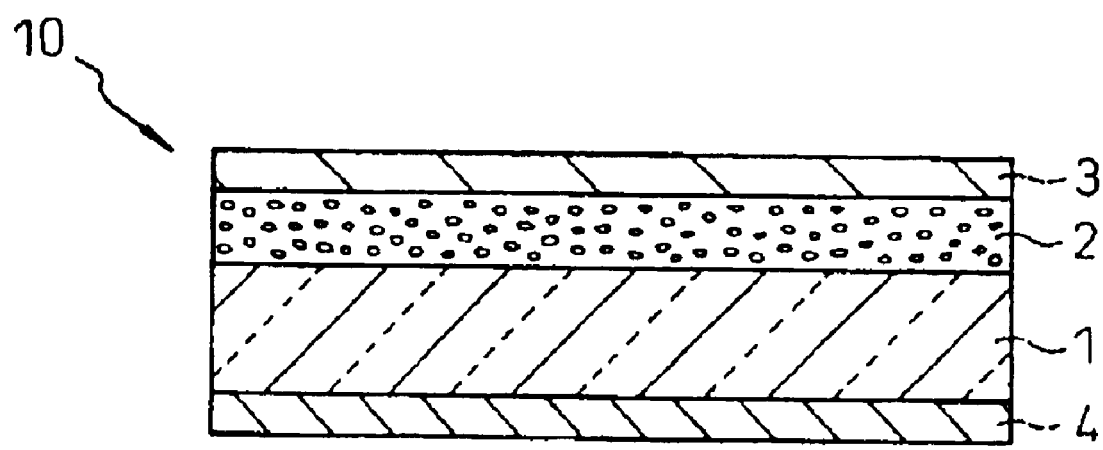
FIG. 3 is a cross-sectional view showing one preferred embodiment of a decorative film for glass-paned windows according to the present invention.

Referring to FIG. 3, a decorative film 10 is shown that comprises a colored layer 2 made of polarizing pearl ink, provided on one surface of a transparent film substrate 1. On the colored layer 2, a clear layer 3 is provided for the purpose of protecting the colored layer 2 and affording luster. On the surface opposite the colored layer 2 of the film substrate 1, an adhesive layer 4 with a release liner (not shown) is provided. This decorative film is particularly designed for glass-paned window of cars. In case of applying on the glass-paned window, the decorative film can be applied to the outside of the glass-paned window via the adhesive layer after removing the release liner.

The decorative film shown in the drawing was produced by the following procedure.

EXAMPLE 1

To use as the substrate, a vinyl chloride film for glass (commercially available from Sumitomo 3M Co., Ltd. under the trade name of "WA581") was prepared. The size of the film was 18 cm in width×120 cm in length×80 $\mu$m in thickness. On one surface of the vinyl chloride film, silk screen printing of a flower pattern was performed by using three colors (green, red and yellow) polarizing pearl inks (containing respectively a scaly titanium dioxide-coated mica flake in the concentration of 5% by weight; an average particle diameter of the mica flake is from about 0 to 50 $\mu$m; commercially available under "Iriodin Series from Merck & Co.). A thickness of the colored layer containing the flower pattern was about 2 to 20 $\mu$m. It was possible to print a fine portion of the flower pattern as the present inventors wish. After the completion of the printing operation, a polyester resin-based clear coating composition (commercially available under the trade name "GA3" from Sumitomo 3M) was coated in the thickness of 5 to 30 μm and then dried for the purpose of protecting the colored layer and improving luster of the film surface. On the back surface of the vinyl chloride film, an acrylic adhesive commercially available under the lot number "1429F-2" from Soken Kagaku Co., Ltd. was laminated in the thickness of about 30 μm.

The decorative film made as described above was applied on the outside of a rear glass of a car by using a squeegee. The decorative film was observed from the outside of the car under sunlight. As a result, the flower pattern printed in the previous step could be clearly observed with excellent pearly luster. Then, the decorative film was observed from the inside of the car under the same sunlight. As a result, the flower pattern observed previously could not be recognized and the outside scene could be observed without any obstruction. The observer's. view was not obstructed by the presence of the decorative film.

Furthermore, the above procedure was repeated except that an application tape (commercially available from Sumitomo 3M Co., Ltd. under the trade name of "SCPM3Y") was laminated on the clear layer in place of an acrylic adhesive layer laminated to the vinyl chloride film. The resulting film was applied on the inside of the rear glass of the car and the flower pattern was observed in the same manner as that described above. The same results were obtained.

EXAMPLE 2

The same procedure as that described in Example 1 was repeated, except that the concentration of the pigment was changed to 1, 10, 15, 30, 40 and 50% by weight, respectively, in order to examine an influence of the amount of the pigment (scaly titanium dioxide-coated mica flake) contained in polarizing pearl ink in this example. As a result, when the concentration is 1% by weight, the color developing effect was poor. When the concentration is from 10 to 15% by weight, the same color developing effect as that of Example 1 was obtained. When the concentration is 30% by weight, the color developing effect was good but the see-through property was slightly lowered. As the concentration increases to 40% by weight, 50% by weight and so on, the see-through property was drastically lowered.

As described above, when the decorative film of the present invention is applied to the place where there is a difference in brightness between the inside and outside, for example, transparent glass-paned windows of structures such as house and building, and transparent glass-paned windows of vehicles such as car and train, not only the inside situation can not be seen through which the decorative film, but also colored patterns such as letter, pattern and design can be seen in the state where the colored patterns appear with the dark glass-caned window as a background. On the other hand, when observing out of the window from the inside of the room or vehicle, not only the colored pattern of the glass-paned window can not be seen, but also outside scene can be seen without any obstruction. Accordingly, the decorative film of the present invention is useful for protecting privacy and screening light. In addition, it makes possible to use the glass-paned window, which has never been used positively, heretofore, for the purpose of performing advertising display and display. Particularly, ink containing an optical coherent pigment used in the present invention can provide the appearance with excellent design and decorative effects, unlike ink with a normal solid color. Not only the decorative film of the present invention is capable of printing a fine pattern by a simple technique, but also it is superior in adhesive force to the glass-paned window.

What is claimed is:

1. A decorative film comprising multiple layers arranged in the following order:
    an adhesive layer;
    a transparent substrate comprising a polymeric film;
    a colored layer comprising ink containing an optical coherent pigment, said colored layer having a thickness in the range of from 2 to 20 μm; and
    a clear polymeric layer,
wherein the colored layer is observable when viewed in sunlight from a side of the decorative film with the clear polymeric layer, the colored layer is not observable when viewed from a side of the decorative film with the adhesive layer, and the decorative film is transparent when viewed from the side of the decorative film with the adhesive layer.

2. The decorative film according to claim 1, wherein said ink is polarizing pearl ink.

3. The decorative film according to claim 2, wherein said polarizing pearl ink contains a pigment and said pigment is a scaly flake pigment.

4. The decorative film according to claim 3, wherein said flako has an average particle diameter in the range of from 5 to 130 μm.

5. The decorative film according to claim 4, wherein the content of said pigment in said polarizing pearl ink is in tho range of from greater than 1% by weight to less than 4% by weight.

6. The decorative film according to claim 2, wherein said polarizing pearl ink contains a pigment and said pigment comprises titanium dioxide-coated mica flake, iron oxide-coated mica flake, or a combination thereof.

7. The decorative film according to claim 2, wherein said polarizing pearl ink comprises a pigment from the group of titanium dioxide-coated mica flake, iron oxide-coated mica flake, bismuth trichloride, a scaly glass flake, and combinations thereof.

8. The decorative film according to claim 1 in combination with a window pane, said decorative film being bonded to a surface of said window pane.

9. The combination according to claim 8, wherein said window pane is an automobile window pane.

10. A method of decorating a window pane comprising:
    providing the decorative film according to claim 1; and
    applying the decorative film to a surface of the window pane using the adhesive layer.

11. The method according to claim 10, wherein the surface is the surface of a glass window pane.

12. The method according to claim 10, wherein the surface is the surface of an automobile window pane.

13. The decorative film of claim 1, further comprising a release liner attached to the adhesive layer.

14. An article comprising:
    a window pane; and
    a decorative film comprising multiple layers arranged in the following order:
        an adhesive layer, wherein the adhesive layer is attached to the window pane;
        a transparent substrate comprising a polymeric film
        a colored layer comprising ink containing an optical coherent pigment, said colored layer having a thickness in the range of from 2 to 20 μm; and a clear polymeric layer, wherein the colored layer is observable when viewed in sunlight from a side of the decorative film with the clear polymeric layer, the colored layer is not observable when viewed from a side of the decorative film with the adhesive layer, and the decorative film is transparent when viewed from the side of the decorative film with the adhesive layer.

15. The article of claim 14, wherein the window pane is part of a room or vehicle.

16. The method of claim 10, wherein the decorative film further comprises a release liner attached to the adhesive layer and said applying comprises removing the release liner.

\* \* \* \* \*

UNITED STATES PATENT AND TRADEMARK OFFICE
CERTIFICATE OF CORRECTION

PATENT NO. : 6,753,056 B1
DATED : June 22, 2004
INVENTOR(S) : Mizumoto, Yoichiro It is certified that error appears in the above-identified patent and that said Letters Patent is hereby corrected as shown below:

<u>Title page,</u>
Item [57], ABSTRACT,
Line 6, delete "One", insert in place thereof -- one --;

<u>Column 6,</u>
Line 28, delete "flako", insert in place thereof -- flake --;
Line 31, delete "tho", insert in place thereof -- the --;
Line 32, delete "4%", insert in place thereof -- 40% --;
Line 64, after "film", insert -- ; --.

Signed and Sealed this

Twenty-third Day of November, 2004

JON W. DUDAS
*Director of the United States Patent and Trademark Office*